United States Patent [19]

Bundens et al.

[11] Patent Number: 4,880,787

[45] Date of Patent: Nov. 14, 1989

[54] CRACKING CATALYST

[75] Inventors: Robert G. Bundens, Mullica Hill; Joseph A. Herbst, Turnersville, both of N.J.

[73] Assignee: Mobil Oil Corporation, New York, N.Y.

[21] Appl. No.: 140,872

[22] Filed: Jan. 6, 1988

Related U.S. Application Data

[63] Continuation of Ser. No. 916,258, Oct. 7, 1986, abandoned, which is a continuation-in-part of Ser. No. 897,000, Aug. 15, 1986, abandoned.

[51] Int. Cl.$^4$ .......................... B01J 29/08; B01J 29/10
[52] U.S. Cl. ......................................... 502/65; 502/79
[58] Field of Search ..................................... 502/65, 79

[56] References Cited

U.S. PATENT DOCUMENTS

| | | | |
|---|---|---|---|
| 2,900,349 | 8/1959 | Schwartz | 252/317 |
| 3,591,488 | 7/1971 | Eberly et al. | 208/111 |
| 3,876,558 | 4/1975 | Granquist | 252/455 Z |
| 3,930,987 | 1/1976 | Grand | 208/111 |
| 4,097,410 | 6/1978 | Gladrow | 252/455 Z |
| 4,099,927 | 7/1978 | McKinney | 23/288 B |
| 4,218,307 | 8/1980 | McDaniel | 208/120 |
| 4,239,654 | 12/1980 | Gladrow et al. | 252/455 Z |
| 4,259,212 | 3/1981 | Gladrow et al. | 252/455 Z |
| 4,289,606 | 9/1981 | Gladrow et al. | 208/120 |
| 4,308,129 | 12/1981 | Gladrow et al. | 208/120 |
| 4,326,947 | 4/1982 | Sawyer et al. | 208/111 |
| 4,354,924 | 10/1982 | Miller | 208/120 |
| 4,376,039 | 3/1983 | Gladrow et al. | 208/120 |
| 4,415,438 | 11/1983 | Dean et al. | 208/120 |
| 4,477,336 | 10/1984 | Scherzer | 208/120 |
| 4,480,047 | 10/1984 | Beck et al. | 502/65 |
| 4,483,764 | 11/1984 | Hensley et al. | 208/111 |
| 4,486,296 | 12/1984 | Oleck et al. | 208/111 |
| 4,561,968 | 12/1985 | Beck et al. | 208/120 |
| 4,581,340 | 4/1986 | Himpal et al. | 502/65 |
| 4,584,090 | 4/1986 | Farnsworth | 208/80 |
| 4,588,701 | 5/1986 | Chiang et al. | 502/65 |
| 4,603,117 | 7/1986 | Sato et al. | 502/65 |
| 4,632,749 | 12/1986 | Hilfman | 502/65 |
| 4,663,025 | 5/1987 | Fu | 502/79 |
| 4,664,780 | 5/1987 | Lochow et al. | 208/120 |

FOREIGN PATENT DOCUMENTS 0155824 9/1985 European Pat. Off. .

OTHER PUBLICATIONS

J. S. GcGee, et al., "Octane Catalysts Contain Special Sieves", *The Oil and Gas Journal Report*, p. 62, May 27, 1985.

*Primary Examiner*—Carl F. Dees
*Attorney, Agent, or Firm*—A. J. McKillop; C. J. Speciale; R. D. Stone

[57] ABSTRACT

New catalyst compositions of superior hydrothermal stability, which evidence increased gasoline plus distillate yields, improved coke selectivity and reduced $C_4$-gas yields, are based on framework dealuminated faujasitic zeolites having a framework silica to alumina molar ratio of from about 5 to 100. In a preferred embodiment, an "ultrastable Y" composited with a matrix, is subjected to a treatment with a source of aluminum and rare earth compounds followed by hydrothermal treatments to improve the hydrothermal stability and selectivity of the catalyst for catalytic cracking. This is evidenced by higher gasoline plus distillate yields and lower coke and gas production at lower catalyst useage per barrel of feed relative to commercial cracking catalysts currently being used.

36 Claims, 2 Drawing Sheets

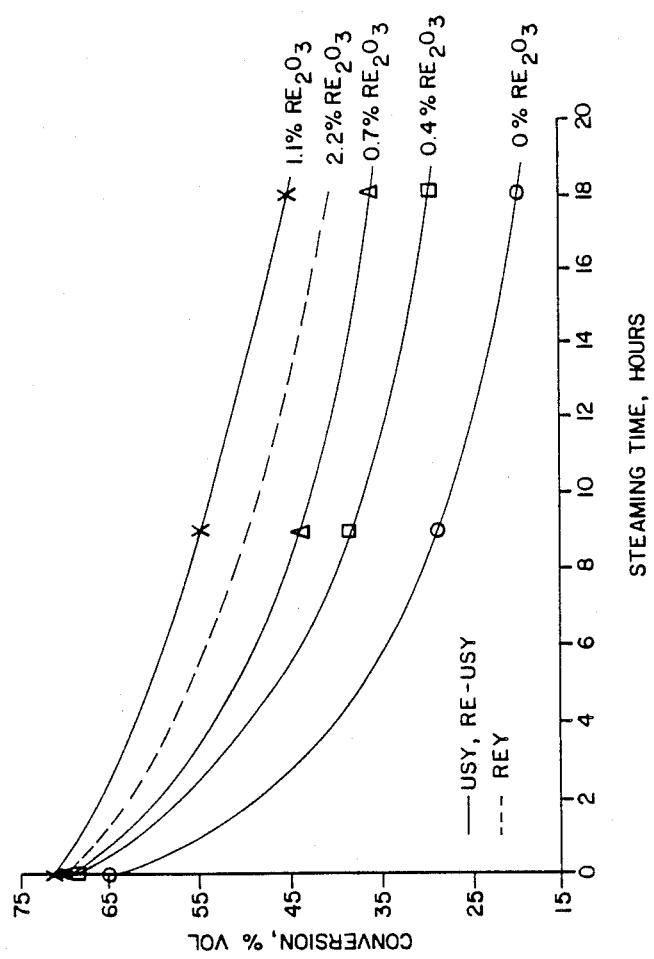

CRACKING CATALYST

CROSS REFERENCE TO RELATED APPLICATIONS

This is a continuation of copending application Ser. No. 916,258, filed on Oct. 7, 1986 (now abandoned) which is a continuation-in-part of Ser. No. 897,000, filed Aug. 15, 1986, (now abandoned) relied upon and incorporated by reference herein.

FIELD OF THE INVENTION

The invention is directed to a new catalyst composition based on framework dealuminated faujasitic zeolites, to its preparation and to its use in catalytic cracking.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by x-ray diffraction. Such zeolites have pores of uniform size which are uniquely determined by the structure of the crystal. The zeolites are referred to as "molecular sieves" because the uniform pore size of the zeolite material allows it to selectively sorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula:

$M_{2/n}O.Al_2O_3.xSiO_2.yH_2O$ In the empirical formula, M was described therein to be sodium, potassium, magnesium, calcium, strontium and/or barium; x is equal to or greater than 2, since $AlO_4$ tetrahedra are joined only to $SiO_4$ tetrahedra, and n is the valence of the cation designated M; and the ratio of the total of silicon and aluminum atoms to oxygen atoms is 1:2. D. Breck, ZEOLITE MOLECULAR SIEVES, John Wiley & Sons, N.Y., p. 5 (1974).

The prior art describes a variety of synthetic zeolites. These zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-11 (U.S. Pat. No. 3,709,979) and zeolite ZSM23 (U.S. Pat. No. 4,076,842), merely to name a few.

The particular faujasitic or Y-type zeolite utilized in this invention has come to be known as ultrastable Y (USY) and is sometimes referred to as dealuminated Y (DAY). A partial list of references describing the nature and methods of preparation of USY or DAY, all of which are incorporated herein by reference are:

1. Maher, P. K., U.S. Pat. No. 3,293,192.
2. Kerr, G. T., J. Phys. Chem., 71: 4155 (1967).
3. McDaniel, C. V., U.S. Pat. No. 3,607,403.
4. Maher, P. K., U.S. Pat. No. 3,402,996.
5. Scherzer, J., "The Preparation and Characterization of Aluminum Deficient Zeolites", ACS Symposium Series, Paper No. 10, June 13-16, (1983), pp. 157-200.

It is clear from these references, and other scientific and patent literature that USY is not a single entity but a family of materials related to zeolite Y. USY is similar to zeolite Y in that its characteristic x-ray diffraction lines are substantially those of zeolite Y as detailed in Tables A, B and C of the above referenced U.S. patent and herein incorporated. USY differs from as-synthesized zeolite Y in that by the nature of the various processing schemes and the degree to which zeolite Y is dealuminated, the effective framework silica-to-alumina ratio is increased. One measure of this change is reflected in the measurement of unit cell size of the resultant zeolite, usually reported in the atomic unit, Angstroms (A). As aluminum is removed from the zeolitic framework, hence causing the zeolitic framework silica-to-alumina ratio to increase, the unit cell size decreases. This results because of differences in bond distances between $AlO_4$ tetrahedra and $SiO_4$ tetrahedra.

U.S. Pat. No. 4,309,280 suggests the use of crystalline zeolites in hydrocarbon conversion processes. Specific processes relating to the cracking of gas oils to produce motor fuels have been described and claimed in many patents including, for example, U.S. Pat. Nos. 3,140,249; 3,140,251; 3,140,252; 3,140,253 and 3,271,418, herein incorporated by reference. In one or more of the above identified patents the combination of zeolites with a matrix for use in catalytic cracking is suggested.

Other references disclose the use of USY or DAY to crack alkanes. For example, A. Corma, et al., in APPLIED CATALYSIS, Vol. 12 (1984), pp. 105-116, present a "Comparison of the Activity, Selectivity and Decay Properties of LaY and HY Ultrastable Zeolites During the Cracking of Alkanes". Pine, L. A., et al., in the JOURNAL OF CATALYSIS, Vol. 85 (1984), pp. 466-476 present data to support the "Prediction of Cracking Catalyst Behavior by a Zeolite Unit Cell Size Model". The performance of cracking catalysts containing USY or DAY are often compared to catalysts containing zeolite Y which has not been intentionally dealuminated. Because of the deleterious effect of sodium on the performance of cracking catalysts USY or DAY catalysts are frequently compared with catalysts containing the hydrogen form of Y zeolite (HY) or the rare earth form of Y zeolite (REY).

In general the patent and scientific literature suggests the following for cracking catalysts containing USY or DAY, containing substantially no rare earth (Those claims being at constant conversion relative to REY containing cracking catalyst): 1. significant increases in gasoline research and motor octane (unleaded); 2. significant decreases in coke make; 3. definitive increases in total $C_3+C_4$ make, particularly $C_3$ olefins and $C_4$ olefins; 4. reductions in gasoline yield.

Furthermore, lower catalytic activity is evidenced with decreasing unit cell size (U.C.S.) of the Y zeolite component. Hence a non-rare earth containing USY or DAY zeolite would exhibit lower activity/stability than a non-dealuminated REY zeolite because the former has a lower U.C.S. both as manufactured and subsequent to equilibration in a conventional cracking unit.

When rare earth components are introduced into these USY or DAY containing catalysts (RE-USY), irrespective of whether they are pre-exchanged onto the zeolite or post-exchanged onto the catalyst, the increases in gasoline research and motor octane (unleaded), the increases in $C_3$ and $C_4$ production and the decreases in coke make are diminished in proportion to the amount of rare earth added. Furthermore lower catalytic activity for the RE-USY is still evidenced relative to non-dealuminated REY.

The catalyst of the present invention as disclosed below performs in a significantly different manner which was not a priori anticipated.

SUMMARY OF THE INVENTION

The present invention is directed to a catalyst composition comprising dealuminated faujasitic zeolites composited with a matrix, said composite additionally containing alumina and rare earth oxides. Optionally the catalyst contains weighting agents, which may or may not themselves possess catalytic activity, and noble metals, rhenium and/or chromium.

The invention is also directed to the method of preparing said catalyst, by compositing a dealuminated faujasitic zeolite and a matrix, said composite being subjected to treatment with a source of aluminum and rare earth compounds and subsequently subjecting said catalyst to one or more hydrothermal treatments.

Lastly, the invention is directed to the use of the new catalyst in catalytic cracking operations to produce higher gasoline and distillate yields while minimizing the production of coke and $C_4$ and lighter gases at lower catalyst useage per barrel of feed by virtue of its superior hydrothermal stability.

BRIEF DESCRIPTION OF THE DRAWINGS

FIG. 2 shows the effect of rare earth level on the hydrothermal stability of the catalyst of the present invention, wherein volume percent conversion of a gas oil to gasoline, lighter components and coke is shown as a function of increasingly severe hydrothermal deactivation, at various rare earth contents.

DETAILED DESCRIPTION OF THE INVENTION

Figure 1:
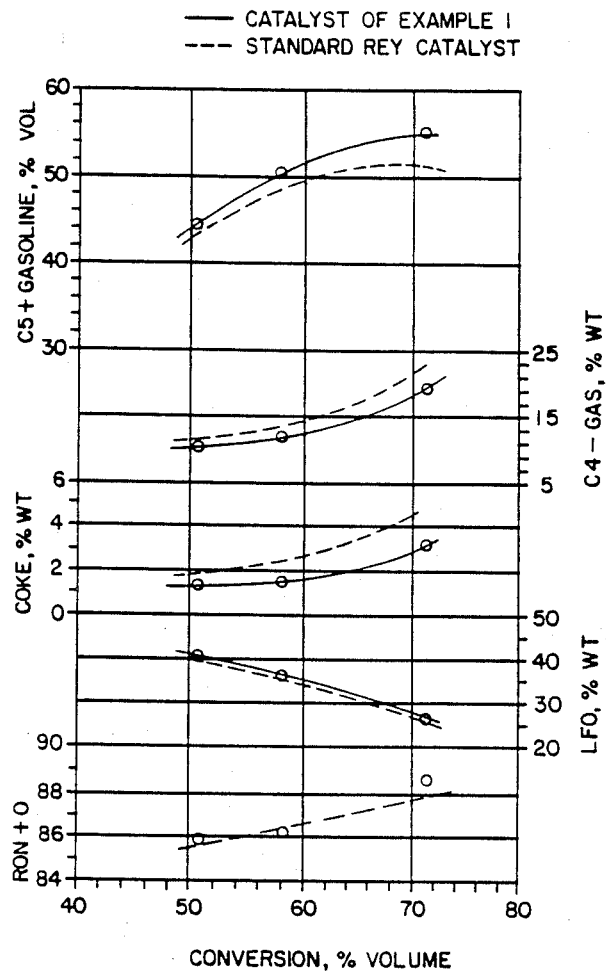
FIG. 1 illustrates the change in selectivity and gasoline octane, wherein the gasoline yield, $C_4$ and lighter gases, coke, light fuel oil and gasoline research octane clear are plotted against the volume percent conversion of a gas oil to gasoline, lighter components and coke for the catalyst of the present invention and compared with the results obtained under identical conditions for a conventional REY cracking catalyst.

Conventional cracking catalysts generally contain amorphous silica-alumina or crystalline aluminosilicates. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally incorporate a large pore crystalline aluminosilicate zeolite into a suitable matrix component which may or may not itself possess catalytic activity. These zeolites typically possess an average crystallographic pore dimension of about 7 angstroms and above for their major pore opening. Representative crystalline aluminosilicate zeolite cracking catalysts of this type include zeolite X, zeolite Y, zeolite ZK-5, zeolite ZK-4, hereinabove referenced, as well as naturally occurring zeolites such as chabazite, faujasite, mordenite, and the like. Also useful are the silicon-substituted zeolites described in U.S. Pat. No. 4,503,023. Zeolite Beta (U.S. Pat. No. 3,308,069) is yet another large pore crystalline aluminosilicate which can be utilized in catalytic cracking.

The catalyst compositions of this invention comprise four essential components: framework dealuminated faujasitic zeolites; a matrix; aluminium compounds; and, rare earth compounds.

The invention relates to catalyst composition 1 to 60 weight percent framework dealuminated Y zeolite, based on the total weight of the composition; 40 to 99 weight percent of a matrix, based on the total weight of said composition; 0.01 to 15 weight percent alumina incorporated into said matrix, based on the total weight of said composition; 0.01 to 10 weight percent rare earth, expressed as the oxides of same, based on the total weight of said composition, dispersed, exchanged, impregnated or deposited in a composite of said zeolite and said matrix.

In general, the crystalline zeolites are ordinarily ion exchanged either separately or in the final catalyst with a desired cation to replace alkali metal present in the zeolite. The exchange treatment is such as to reduce the alkali metal content of the final catalyst to less than about 1.5 weight percent and preferably less than about 1.0 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof. Ion exchange is suitably accomplished by conventional contact of the zeolite with a suitable salt solution of the desired cation such as, for example, the sulfate, chloride or nitrate.

The framework dealuminated faujasitic zeolites suitable for use in the present invention are modified in activity by dilution with a matrix component of significant or little catalytic activity. It may be one providing a synergistic effect as by large molecule cracking, large pore material and act as a coke sink. Catalytically active inorganic oxide matrix material is particularly desired because of its porosity, attrition resistance and stability under the cracking reaction conditions encountered particularly in a catalyst cracking operation. Catalysts of the present invention are readily prepared by dispersing the zeolitic component in a suitable siliceous sol and gelling the sol by various means.

The inorganic oxide which serves as a matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. Particularly preferred is a silica-alumina cogel. The above gels and cogels will generally comprise a major proportion of silica and a minor proportion of the aforementioned oxide or oxides.

Generally the amount of framework dealuminated faujasitic zeolites in the disclosed catalyst compositions ranges from 1 to 60 weight percent based on the total weight of the composition; preferably, they range from 5 to 45 weight percent; and, most preferably they range from 5 to 40 weight percent. Correspondingly, the amount of matrix will vary from 40 to 99 weight percent, based on total weight of said composition; preferably it will vary from 55 to 95 weight percent; most preferably said matrix will vary from 60 to 95 weight percent.

Another important aspect of the catalysts of the present invention is the presence of aluminum compounds. These may be available by virtue of their presence within the dealuminated zeolite or by virtue of their presence in the particular matrix chosen for compositing with said zeolites or a combination of both. Alternately they may be provided by incorporation into said composite via dispersion, ion exchange, impregnation and/or deposition by techniques known to those skilled in the art as incipient wetness impregnation, ion exchange, coating, merely to name a few pertinent techniques. The amount of alumina incorporated can range from 0.01 to 15 weight percent, based on total weight of said composition; preferably, the alumina can vary from 0.01 to 10 weight percent; most preferably, it can vary from 0.01 to 7 weight percent.

Yet still another important aspect of the catalysts of the present invention is the presence of rare earth compounds. These may be available by virtue of their presence within the dealuminated zeolite or by virtue of their presence in the particular matrix chosen for compositing with said zeolites or a combination of both. Alternately they may be provided by incorporation into said composite via dispersion, ion exchange, impregnation and/or desposition by techniques known to those skilled in the art as incipient wetness impregnation, ion exchange, coating, merely to name a few pertinent techniques. The amount of rare earth incorporated can range from 0.01 to 10 weight percent, expressed as trivalent oxides of same, based on the total weight of said composition; preferably, the rare earth content can vary from 0.01 to 6 weight percent; most preferably, it can vary from 0.01 to 4 weight percent.

In a preferred embodiment the catalyst compositions allow that the inorganic oxide matrix may be combined with a raw or natural clay, a calcined clay, or a clay which has been chemically treated with an acid or an alkali medium or both. Preferred clays are those belonging to the families of clay commonly known as kaolin, bentonite, montmorillonite or halloysite. Alternately or in addition the inorganic oxide matrix may be combined with weighting or densifying agents including, for example, alumina (corundum), magnesia, beryllia, barium oxide, zirconia and/or titania. Preferably from 1 to 80 wt % of the matrix comprises a weighting agent, a densifying agent, or mixtures thereof selected from the group of alumina (corundum) $TiO_2$, $ZrO_2$ and clays.

In another preferred embodiment the catalyst compositions of the present invention can incorporate noble metals and/or rhenium therein.

A recent advance in the art of catalytic cracking is disclosed in U.S. Pat. No. 4,072,600, the entire contents of which are incorporated herein by reference. One embodiment of this aforesaid patent teaches that trace amounts of a metal selected from the group consisting of platinum, palladium, iridium, osmium, rhodium, ruthenium, and rhenium when added to cracking catalysts enhance significantly conversion of carbon monoxide during the catalyst regeneration operation.

In employing this recent advance to the present invention, the amount of said metal added to the catalysts of the present invention can vary from between about 0.01 ppm and about 100 ppm based on total catalyst inventory; preferably, 0.01 to 50 ppm by weight; most preferably, 0.01 to 5 ppm by weight.

In yet another preferred embodiment the catalyst compositions herein disclosed can include chromium. The methods of incorporation of chromium are substantially the same as those disclosed heretofore for both the aluminum and rare earth compounds. The amount of chromium incorporated, expressed as $Cr_2O_3$, based on the total weight of said composition, can vary from 0.01 to 1 weight percent chromium; preferably, 0.01 to 0.5 weight percent; most preferably 0.01 to 0.3 weight percent.

In accordance with the invention, the composition can be used alone or in combination with a zeolite having a Constraint Index of 1 to 12. One such zeolite is ZSM-5; if the Constraint Index of ZSM-5 is measured at different temperatures, but within the bounds of the limits of conversion set forth below, it is found to vary but remains within the range of 1 to 12. Cf. Frilette et al., "Catalysis by Crystalline Aluminosilicates: Characterization of Intermediate Pore-size Zeolites by 'Constraint Index'", *Journal of Catalysis*, Vol. 67, No. 1, Jan. 1981, pp. 218–221.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons.

It is to be realized that the above constraint index values typically characterize the specified zeolites but that these are the cumulative result of several variables used in determination and calculation thereof. Thus, for a given zeolite depending on the temperature employed within the range of 550° F. to 950° F., with accompanying conversion between 10% and 60%, the constraint index may vary within the indicated approximate range of 1 to 12. Likewise, other variables, such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is an approximation, taking into consideration the manner of its determination, with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina mole ratio. In those instances, a temperature of up to about 1000° F and a liquid hourly space velocity of less than one, such as 0.1 or less, can be employed in order to achieve a minimum total conversion of about 10%.

The catalyst compositions of the present invention can be used in catalytic cracking processes. Constant conversion comparisons, relative to conventional REY cracking catalysts, reveal that the new catalyst compositions disclosed herein yield:

(1) significant increases in gasoline volume without significant increases in research or motor octane (clear). This is in marked contrast to what has been claimed for prior art USY or DAY containing cracking catalysts.

Prior art USY or DAY containing cracking catalysts, which are substantially free of rare earth elements are characterized by their ability to significantly increase the research and motor octane of gasoline produced from catalytic cracking albeit at a yield penalty.

(2) significant reductions in $C_4$ and lighter gas make. This also is directionally opposite to what has been claimed for prior art USY or DAY cracking catalysts.

(3) significant reductions in coke make. This feature is associated with prior art USY or DAY cracking catalysts provided that they are substantially free of rare earth elements. By contrast the desirable feature of low coke make is evident at all levels of rare earth content for the catalyst compositions of this invention, the opposite being true for prior art USY or DAY cracking catalysts.

(4) significant increases in the amount of the more desirable hydrocarbon fraction known as light fuel oil concomitant with reductions in the amount of the less desirable hydrocarbon fraction known as heavy fuel oil.

The desirable features associated with the use of the present catalysts in catalytic cracking are graphically shown in FIG. 1 which is discussed above. The benefits derivable from use of the present catalysts in catalytic cracking are further described in the examples given below.

Another significant feature of the catalysts of the present invention, which renders them particularly useful in catalytic cracking processes, is their catalytic activity/stability relative to state-of-the-art REY, USY and RE-USY containing cracking catalysts. As can be seen graphically in FIG. 2 and further in the examples given below catalytic activity increases and hydrothermal stability improves as rare earth content increases. Furthermore it can be seen that at certain rare earth loadings the catalysts of the present invention exhibit superior activity and hydrothermal stability relative to conventional R(:Y cracking catalysts. Hence certain catalysts of the present invention will require lower useage per barrel of fuel relative to commercial cracking catalysts currently in use.

Hydrocarbon charge stocks undergoing cracking in accordance with this invention comprise hydrocarbons generally and, in particular, petroleum fractions having an initial boiling range of at least 400° F., a 50% point range of at least 500° F. and an end point range of at least 600° F. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

Catalytic cracking, in which the catalysts of the invention are employed, embraces operational conditions including temperature ranges of about 400° F. (204° C.) to 1200° F. (649° C.) and reduced, atmospheric or super atmospheric pressures. The catalytic cracking process may be operated batchwise or continuously. The catalytic cracking process can be either fixed bed, moving bed or fluidized bed. The hydrocarbon chargestock flow may be either concurrent or countercurrent to the catalyst flow. The process of the invention is applicable to fluid catalytic cracking (FCC) processes. Briefly, in the FCC process, the catalyst is in the form of microspheres, which act as a fluid when suspended in oil vapor or gas. The hydrocarbons contact the fluidized catalysts and are catalytically cracked to lighter products. Deactivation of the catalyst by coke necessitates regeneration of the coked catalyst in the regenerator of an FCC unit. Although the design and construction of individual FCC units can vary, the essential elements of an FCC unit are illustrated in U.S. Pat. No. 4,368,114 which is incorporated herein by reference.

The process of the invention is also directed to moving bed catalytic cracking units having moving bed catalyst regeneration units associated therewith. Thermofor catalytic cracking (TCC) and Houdriflow catalytic cracking are representative of such moving bed cracking and moving bed regeneration units. The catalyst is generally maintained as a downflowing moving bed of catalyst. The catalysts may be disposed of an annular bed, with radial, in or out, gas flow. The moving catalyst bed may have the cross section of a circle or a rectangle with gas flow from the lower portion of the catalyst bed to the upper or the reverse. Alternatively, gas flow may be across the moving bed of catalyst, or some combination of cross-flow, downflow and upflow. Generally, although the catalyst from the moving bed of a catalytic cracking unit is usually stripped before being sent to the regenerator, there is usually a small amount of hydrocarbon, and hydrogen-containing coke, contained on the catalyst. This material is relatively easy to burn, and is usually burned from the catalyst in the top 5 to 10% of the moving bed catalyst regeneration unit. Usually more severe conditions are necessary to completely remove the more refractive, relatively hydrogen-free coke that remains on the catalyst after hydrocarbons are burned off, so progressively more severe operating conditions are experienced in the lower portions of the moving bed. These conditions may be increased temperature, increased oxygen concentration, or both.

After cracking, the resulting product gas is compressed and the resulting products may suitably be separated from the remaining components by conventional means such as adsorption, distillation, etc.

The following comparative examples serve to illustrate the composition and process for preparing the catalysts of this invention and the advantages of their use in hydrocarbon processing, more particularly catalytic cracking, without limiting the same.

EXAMPLE 1

To prepare the catalysts of the present invention, a typical formulation is herewith described. Two solutions were prepared; Solution A contained 41.67 parts sodium silicate ($SiO_2/Na_2O$ ratio of 3.22), 3.00 parts Davison Z-14US ultrastable Y zeolite (USY), 9.26 parts alpha alumina (corundum), 1.92 parts NaOH, and 40.93 parts $H_2O$. Solution B contained 3.47 parts $Al_2(SO_4)_3$, 5.87 parts $H_2SO_4$, and 90.66 parts $H_2O$. These two solutions were cooled to 60° F. and combined by mixing through a nozzle such that the pH was maintained at 8.4 plus or minus 0.2. The resultant mixture was passed through a 5 foot column of oil at room temperature during which time the combined solutions formed spherical particles less than ¼ inch in diameter and gelled prior to contact with water. These rigid particles were then separated from and washed essentially free of residual oil. The particles were then contacted with a solution of 1.5% wt $Al_2(SO_4)_3$ for a total of 18 hours, using new solution every two hours and subsequently washed until no sulfate could be detected in the effluent by testing with barium chloride solution. Next they were contacted with a solution containing 0.75% wt $RECl_3 \cdot 6H_2O$ (Rare Earth Chloride, Code 1433, manufactured by Davison Specialty Chemical Co.) for a period of 6 hours and washed with water until no residual chloride could be detected in the effluent by testing with silver nitrate solution. The catalyst was placed in slotted trays and dried in an approximately 100% steam atmosphere to a final temperature of 320° F. for a minimum of 15 minutes. The catalyst was further subjected to steam calcination or tempering for 12 hours at 1290° F. in approximately 95% steam/5% air at atmospheric pressure. Physical and chemical properties of the catalyst are shown in Table 1, along with the properties of two commercial REY catalysts designated as Catalyst A and Catalyst B.

TABLE 1

|  | Example 1 | Catalyst A | Catalyst B |
|---|---|---|---|
| Chemical |  |  |  |
| Silica, % wt | 57.0 | 50.5 | 48.8 |
| Alumina, % wt | 42.0 | 42.8 | 40.4 |
| $RE_2O_3$, % wt | 1.08 | 2.20 | 2.90 |
| Na, % wt | 0.13 | 0.16 | 0.40 |
| Ash, % wt @ 1000° C. | 98.3 | 97.2 | 96.9 |
| Physical |  |  |  |
| Surface Area, $m^2/g$ | 132 | 165 | 149 |
| Real Density, g/cc | 2.73 | 2.77 | ND |
| Particle Density, g/cc | 1.32 | 1.37 | ND |
| Pore Volume, cc/g | 0.39 | 0.36 | ND |
| Avg. Pore Diameter, Angstroms | 118 | 89 | ND |
| Diffusivity, $cm^2/sec \times 1000$ | 31 | 20 | ND |
| Unit Cell Size, Angstroms | 24.42 | 24.62 | ND |

ND = Not Determined

EXAMPLE 2

The catalyst of Example 1 was evaluated cracking Mid-Continent Pipeline Gas Oil (MCPLGO) in a fixed bed reactor. Vapors of the gas oil are passed through the catalyst at 925° F. substantially at atmospheric pressure at a feed rate of 3 volumes of liquid oil per volume of catalyst per hour for 10 minutes. The method of measuring the instant catalyst was to compare the various product yields obtained with such catalyst with yields of the same products given by a commercial REY catalyst. The differences (Delta values) shown hereinafter represent the yields given by the present catalyst minus yields given by the REY catalyst. In addition, samples were steam deactivated for 9 and 18 hours in a 100% steam atmosphere at 1300° F. and 40 psig prior to catalytic evaluation. The results are presented graphically in FIG. 1 and at constant 60 volume percent conversion in Table 2. As is readily apparent, the catalyst of the present invention yields, at constant conversion, significantly more gasoline and light fuel oil while reducing coke and $C_4^-$ gas yields.

TABLE 2

| Mid-Continent Gas Oil | | |
|---|---|---|
|  | REY | EXAMPLE 1 |
| 60 Vol % Conversion |  | Δ |
| $C_5^+$ Gasoline, % Vol | 48.8 | +2.7 |
| Total $C_4$'s, % Vol | 12.5 | −0.9 |
| $C_3^-$ Gas, % Wt | 6.2 | −0.7 |
| Coke, % Wt | 2.9 | −1.1 |
| LFO, % Wt | 33.7 | +1.1 |
| HFO, % Wt | 7.4 | −1.0 |
| Potential Alkylate, % Vol | 14.9 | +1.4 |

TABLE 2-continued

| Mid-Continent Gas Oil | | |
|---|---|---|
|  | REY | EXAMPLE 1 |
| G + D + PA, % Vol | 97.4 | +5.2 |

EXAMPLE 3

To study the contribution of the aluminum exchange on the catalyst, two catalysts were prepared by the technique described in Example 1, except that one sample was treated for 24 hours in $NH_4OH$ followed by nine 2-hour exchanges with 2% wt $(NH_4)_2SO_4$ rather than 1.5% wt $Al_2(SO_4)_3$. Both catalysts were then washed sulfate free and dried without rare earth exchange, followed by steam tempering as in Example 1. The chemical/physical properties are listed in Table 3. These catalysts were steam deactivated for 9 hours in a 100% steam atmosphere at 1300° F. and 40 psig and tested catalytically at the same conditions stated in Example 2; the results are reported in Table 4. The catalyst of the present invention shows higher initial activity, and better retention of activity after steaming.

TABLE 3

| Exchange Solution | Aluminum | Ammonium |
|---|---|---|
| Chemical |  |  |
| Silica, % Wt | 52.0 | 53.5 |
| Alumina, % Wt | 45.2 | 44.4 |
| $RE_2O_3$, % Wt | 97.0 | 93.9 |
| Na, % Wt | 0.29 | 0.35 |
| Ash, % Wt @ 1000° C. | 98.9 | 98.7 |
| Physical |  |  |
| Surface Area, $m^2/g$ | 138 | 155 |
| Real Density, g/cc | 2.77 | 2.77 |
| Particle Density, g/cc | 1.22 | 1.01 |
| Pore Volume, cc/g | 0.46 | 0.63 |
| Avg. Pore Diameter, Angstroms | 133 | 164 |
| Diffusivity, $cm^2/sec \times 1000$ | 64 | 59 |
| Unit Cell Size, Angstroms | 24.33 | 24.36 |

TABLE 4

|  | Unsteamed | | Steamed | |
|---|---|---|---|---|
|  | Alum | $NH_4$ | ALUM | $NH_4$ |
| Conversion, % Vol | 64.9 | 50.9 | 29.0 | 18.3 |
| $C_5^+$ Gasoline, % Vol | 51.7 | 43.7 | 26.5 | 17.7 |
| Total $C_4$, % Vol | 15.5 | 9.1 | 3.8 | 1.2 |
| $C_3^-$ Gas, % Wt | 7.0 | 4.9 | 2.6 | 1.8 |
| Coke, % Wt | 1.91 | 1.58 | 0.95 | 0.91 |
| Alkylate, % Vol | 22.7 | 14.6 | 7.7 | 3.2 |
| $C_5^+$ Gasoline + Alkylate, % Vol | 74.4 | 58.3 | 34.2 | 20.8 |
| RON + 0, $C_5^+$ Gasoline | 88.5 | 85.8 | 87.5 | 86.4 |
| RON + 0, $C_5^+$ Gasoline + Alkylate | 90.2 | 87.9 | 89.0 | 87.6 |
| LFO, % Wt | 32.2 | 41.1 | 52.7 | 56.8 |
| HFO, % Wt | 4.5 | 8.9 | 18.1 | 24.2 |
| G + D, % Wt | 76.3 | 78.6 | 75.8 | 72.3 |

EXAMPLE 4

To study the contribution of rare earth on catalytic performance, catalysts were prepared at increasing levels of rare earth. The chemical/physical properties are listed in Table 5. The results of catalytic evaluations are given in Table 6. In addition, the catalysts' hydrothermal stability was evaluated by deactivating the catalysts for 9 and 18 hours in a 100% steam atmosphere at 1300° F. and 40 psig prior to catalytic evaluation. The results are shown in FIG. 2. As is readily apparent, the importance of sufficient rare earth on the final catalyst is seen in the effect on hydrothermal stability. Hydrothermal stability is improved with increasing rare earth content. It is further seen that the activity/stability of the catalyst of this invention at sufficiently high rare earth levels exceeds that of a conventional non-dealuminated REY catalyst.

TABLE 5

| Chemical | | | | |
|---|---|---|---|---|
| Silica, % Wt | 52.0 | 52.0 | 52.0 | 51.0 |
| Alumina, % Wt | 45.2 | 44.8 | 44.8 | 44.0 |
| $RE_2O_3$, % Wt | 0 | 0.4 | 0.7 | 1.1 |
| Na, % Wt | .10 | .12 | .13 | .14 |
| Ash, % Wt @ 1000° C. | 98.9 | 98.9 | 99.2 | 98.5 |
| Physical | | | | |
| Surface Area, $m^2/g$ | 138 | 141 | 145 | 148 |
| Real Density, g/cc | 2.77 | 2.77 | 2.78 | 2.79 |
| Particle Density, g/cc | 1.22 | 1.25 | 1.20 | 1.22 |
| Pore Volume, cc/g | 0.45 | 0.44 | 0.47 | 0.46 |
| Avg. Pore Diameter, Angstroms | 133 | 125 | 130 | 128 |
| Diffusivity, $cm^2/sec \times 1000$ | 64 | 69 | 68 | 66 |
| Unit Cell Size, Angstroms | 24.33 | 24.35 | 24.41 | 24.38 |

TABLE 6

| Rare Earth Level, % Wt | 0 | 0.4 | 0.7 | 1.1 |
|---|---|---|---|---|
| Conversion, % Vol | 64.9 | 68.4 | 70.2 | 71.4 |
| $C_5^+$ Gasoline, % Vol | 51.7 | 55.8 | 57.4 | 57.7 |
| Total $C_4$, % Vol | 15.5 | 14.8 | 14.7 | 15.4 |
| $C_3^-$ Gas, % Wt | 7.0 | 7.3 | 7.5 | 7.6 |
| Coke, % Wt | 1.91 | 2.10 | 2.36 | 2.39 |
| Alkylate, % Vol | 22.7 | 21.1 | 21.2 | 21.3 |
| $C_5^+$ Gasoline + Alkylate, % Vol | 74.4 | 76.9 | 78.6 | 79.0 |
| RON + 0, $C_5^+$ Gasoline | 88.5 | 86.1 | 86.4 | 86.1 |
| RON + 0, $C_5^+$ Gasoline + Alkylate | 90.2 | 88.3 | 88.5 | 88.2 |
| LFO, % Wt | 32.2 | 29.6 | 28.2 | 27.3 |
| HFO, % Wt | 4.5 | 3.8 | 3.5 | 3.3 |

TABLE 6-continued

| Rare Earth Level, % Wt | 0 | 0.4 | 0.7 | 1.1 |
|---|---|---|---|---|
| G + D, % Wt | 76.3 | 77.0 | 76.9 | 76.5 |

EXAMPLE 5

To see if this catalyst was chargestock specific, the catalyst of Example 1 was evaluated cracking two additional type crudes. The results of this evaluation are given in Table 7. In all cases, the catalyst of the present invention shows improved liquid yields at the expense of gas and coke. As can be seen from the properties in Table 8, the heavier the feed, the more effective is the catalyst of this invention.

TABLE 7

| | Altona Mixed Feed (1) | | Frontignan Gas Oil (2) | |
|---|---|---|---|---|
| | REY-9A | EXAMPLE 1 | REY-9A | EXAMPLE 1 |
| 60 Vol % Conversion | | | | |
| $C_5^+$ Gasoline, % Vol | 47.5 | +2.4 | 43.2 | +4.2 |
| $C_5^+$ Gasoline, RON + 0 | 85.4 | −0.9 | 88.5 | −1.5 |
| Total $C_4$'s, % Vol | 13.1 | −1.0 | 11.9 | +0.1 |
| $C_3^-$ Gas, % Wt | 6.3 | −0.7 | 8.3 | −1.3 |
| Coke, % Wt | 2.3 | −1.0 | 5.9 | −2.3 |
| LFO, % Wt | 31.5 | +1.7 | 30.0 | +1.4 |
| HFO, % Wt | 10.0 | −1.7 | 11.9 | −1.1 |
| Potential Alkylate, % Vol | 19.7 | +0.4 | 13.8 | +2.2 |
| G + D + PA, % Vol | 98.7 | +4.5 | 87.0 | +7.8 |

(1) Derived from Gippsland Crude
(2) Derived from Middle East and North African Crudes

TABLE 8

| Chargestock Properties | | | | |
|---|---|---|---|---|
| | JSHGO (1) | Frontignan (2) GasOil | Altona (3) Mixed Feed | (4) MCPLGO |
| API Gravity | 24.3 | 23.2 | 34.6 | 29.0 |
| Specific Gravity, 60° F. | 0.9082 | .9147 | 0.8519 | .8816 |
| Pour Point, °F. | 95 | 100 | 105 | 80 |
| KV @ 100° C., cs | 3.62 | 5.51 | 2.995 | 3.51 |
| Refractive Index, 70° C. | 1.5081 | 1.4902 | 1.46059 | 1.4716 |
| Aniline Point | 171 | 172 | 202.7 | 178 |
| Bromine Number | 4.2 | 8.8 | 2.2 | 1.9 |
| CCR, wt % | 0.29 | 0.36 | 0.21 | 0.48 |
| Sulfur, wt % | 1.87 | 1.62 | 0.145 | 0.56 |
| Hydrogen, wt % | 12.23 | 12.55 | 13.30 | 12.79 |
| Nitrogen, % wt | 0.03 | 0.11 | 0.04 | 0.07 |
| Nitrogen, basic, ppm | 327 | — | 109 | 144 |
| Molecular Weight | 358 | — | 306 | — |
| Nickel, ppm | 0.15 | .39 | 0.27 | |
| Vanadium, ppm | 0.18 | .59 | 0.10 | |
| Iron, ppm | 9.3 | — | 3.13 | |
| Copper, ppm | 0.10 | — | 0.10 | |
| Distillation (D1160), °F. | | | | |
| IBP | 414 | — | 422 | 434 |
| 5%, vol | 548 | — | 561 | 550 |
| 10% | 614 | 627 | 608 | 577 |
| 20% | 667 | — | 667 | 604 |
| 30% | 701 | 741 | 703 | 624 |
| 40% | 733 | — | 733 | 658 |
| 50% | 767 | 805 | 756 | 700 |
| 60% | 801 | — | 778 | 743 |
| 70% | 839 | 864 | 802 | 789 |
| 80% | 877 | — | 831 | 837 |
| 90% | 924 | 950 | 882 | 888 |
| 95% | 956 | — | 929 | 924 |
| EP | — | — | 937 | — |
| Composition, wt % | | | | |
| Paraffins | 23.5 | 49.4 | 60 | 30.7 |

TABLE 8-continued

| | Chargestock Properties | | | |
|---|---|---|---|---|
| | JSHGO (1) | Frontignan (2) GasOil | Altona (3) Mixed Feed | (4) MCPLGO |
| Naphthenes | 32.0 | 29.2 | 15 | 35.7 |
| Aromatics | 44.5 | 21.4 | 25 | 33.6 |

(1) Joliet Sour Heavy Gas Oil
(2) Derived from Middle East and North African Crudes
(3) Derived from Gippsland Crude
(4) Mid-Continent Pipeline Gas Oil

EXAMPLE 6

A catalyst was prepared in the identical manner of Example 1, except after the rare earth exchange and final wash, the undried particles were mixed in a high shear mixer with sufficient deionized water to form a pumpable slurry and passed through a homogenizer. The homogeneous slurry was then fed to a spray dryer and particles typical in size to those used in FCC were prepared. This catalyst which contained 12% USY was subsequently steam deactivated at 1450° F. for 10 hours at 0 psig in a 45% steam/55% air atmosphere. For comparison, a catalyst not of this invention, containing 12% calcined REY, was prepared in a similar manner to this example and also subjected to steam deactivation.

EXAMPLE 7

The catalysts prepared in Example 6 were evaluated in a fixed-fluidized bench unit cracking Joliet Sour Heavy Gas Oil (JSHGO) at 960° F. with a feed rate of 12 to 24 grams of liquid oil per gram of catalyst per hour and a run time of 1 minute. The results are shown in Table 9. As can be seen, the catalyst of the present invention results in increased gasoline yield and lower coke and $C_4^-$ gas make.

TABLE 9

| | Example 6 | REY |
|---|---|---|
| Conversion, % Vol | 65.0 | 65.0 |
| $C_5^+$ Gasoline, % Vol | 51.2 | 48.4 |
| Total $C_4$'s, % Vol | 15.5 | 16.0 |
| $C_3^-$ Gas, % Wt | 7.4 | 8.3 |
| Coke, % Wt | 3.26 | 4.00 |
| Alkylate, % Vol | 24.2 | 24.7 |
| $C_5^+$ Gasoline + Alkylate, % Vol | 75.4 | 73.1 |
| LFO, % Wt | 30.1 | 30.9 |
| HFO, % Wt | 7.1 | 6.3 |
| G + D, % Wt | 72.3 | 71.2 |

EXAMPLE 8

A catalyst of the present invention was prepared according to the procedure of Example 1, except the finished catalyst contained 20% USY vs 12% USY in Example 1. The chemical/physical properties are shown in Table 10. This catalyst also shows the advantage in increased gasoline yield and lower coke and gas over currently available REY catalysts.

TABLE 10

| | |
|---|---|
| Silica, % Wt | 66.0 |
| Alumina, % Wt | 40.4 |
| $RE_2O_3$, % Wt | 1.42 |
| Na, % Wt | 0.17 |
| Ash, % Wt @ 1000° C. | 99.0 |
| Surface Area, $m^2$/g | 201 |
| Real Density, g/cc | 2.67 |
| Particle Density, g/cc | 1.34 |
| Pore Volume, cc/g | 0.37 |
| Avg. Pore Diameter, Angstroms | 74 |
| Diffusivity, $cm^2$/sec × 1000 | 22 |

TABLE 10-continued

| | |
|---|---|
| Unit Cell Size, Angstroms | 24.44 |

EXAMPLE 9

A catalyst was prepared in the identical manner of Example 1, except that 0.6 parts $CrK(SO_4)_2 \cdot 12H_2O$ was added to solution B prior to mixing with solution A. Analysis of the finished catalyst was essentially the same as in Example 1, with the addition of 0.13% wt Cr. Catalytic evaluation showed identical performance to the catalyst of Example 1.

EXAMPLE 10

A catalyst was prepared in the identical manner of Example 1, except that the particles were contacted with a solution containing $Pt(NH_3)_4Cl_2$ for a period of 1 hour subsequent to the final water wash following the rare earth exchange. Chemical analysis showed approximately 5 ppm Pt on the finished catalyst. Catalytic evaluation showed identical performance to the catalyst of Example 1.

EXAMPLE 11

The catalyst of Example 1 was evaluated cracking Gippsland reduced crude and compared against a commercial REY catalyst. The results are shown in Table 11. As can be seen, the use of the catalyst of the present invention is particularly advantageous when using heavy feedstocks. Significant gains in liquid products are made at the expense of $C_4^-$ gases and coke.

TABLE 11

| | REY | EXAMPLE 1 | Δ |
|---|---|---|---|
| Gippsland Atmospheric Resid[1] | | | |
| Conversion, % Vol | 70.0 | 70.0 | — |
| $C_5^+$ Gasoline, % Vol | 51.2 | 58.3 | +7.1 |
| Total $C_4$'s, % Vol | 17.3 | 14.8 | −2.5 |
| $C_3^-$ Gas, % Wt | 7.3 | 5.4 | −1.9 |
| Coke, % Wt | 5.8 | 3.4 | −2.4 |
| $C_3=$, % Vol | 5.1 | 5.3 | +0.2 |
| $C_4=$, % Vol | 4.4 | 5.4 | +1.0 |
| $iC_4$, % Vol | 9.6 | 7.1 | −2.5 |
| Alkylate, % Vol | 15.7 | 17.8 | +2.1 |
| Gasoline + Alkylate, % Vol | 66.9 | 76.1 | +9.2 |
| Outside $iC_4$ Req'd, % Vol | 1.6 | 5.4 | +3.8 |

[1]Run Conditions: 875° F., 4C/O, 1.5 LHSV.

What is claimed is:

1. A catalyst composition comprising 1 to 60 weight percent framework dealuminated Y zeolite, based on the total weight of the composition;
    40 to 99 weight percent of a matrix, based on the total weight of said composition;
    0.01 to 15 weight percent alumina incorporated into said catalyst composition via ion exchange based on the total weight of said composition;

0.01 to 10 weight percent rare earth, expressed as the oxides of same, based on the total weight of said composition, dispersed, exchanged, impregnated or deposited in a composite of said zeolite and said matrix.

2. The composition of claim 1 wherein from 1 to 80 weight percent of the matrix comprises a weighting agent, a densifying agent or mixtures thereof selected from the group consisting of alumina (corundum), $TiO_2$, $ZrO_2$ and clays.

3. The composition of claim 1 which further includes 0.01 to 1 weight percent chromium, expressed as $Cr_2O_3$, based on the total weight of said composition.

4. The composition of claim 1 which further includes 1 to 5000 ppm by weight, based on the total weight of said composition, of at least one noble metal, rhenium or mixtures thereof.

5. The composition of claim 1 in which the alkali metal content ranges from 0.000 to 1.0 weight percent, based on the total weight of said composition.

6. The composition of claim 1 wherein the silica-alumina molar ratio of the framework zeolite dealuminated Y incorporated therein is from about 5 to about 100.

7. The composition of claim 1 wherein said zeolite is in the hydrogen form.

8. The composition of claim 1 wherein said zeolite is in rare earth exchanged form.

9. The composition of claim 1 wherein said zeolite is in the $NH_4^+$ form.

10. The composition of claim 1 wherein said rare earth is lanthanum, cerium or mixtures thereof and/or any element of the lanthanide series of the periodic chart of elements.

11. The composition of claim 1 wherein said matrix is $SiO_2$, $Al_2O_3$, $SiO_2$-$Al_2O_3$, $TiO_2$, $ZrO_2$, clay or mixtures thereof.

12. The composition of claim 1 wherein said matrix is silica-alumina.

13. The composition of claim 1 wherein the unit cell size, as determined by X-ray diffraction, of the faujasite component in the finished catalyst has a value from about 24.25A to about 24.55A.

14. A process for making a catalytic cracking composition comprising: (1) compositing a framework dealuminated Y-type zeolite and a matrix, to form a composite with a source of aluminum added by ion exchange and rare earth compounds whereby said aluminum and rare earth compounds are dispersed, impregnated, exchanged or deposited into said composite, and (3) drying said composite.

15. The process of claim 14 wherein the catalyst is dried in the presence of from about 1 to 100 volume percent steam.

16. The process of claim 14 wherein the catalyst is calcined by subjecting it to temperatures in excess of 400° F.

17. The process of claim 16 wherein the catalyst is calcined in the presence of from about 1 to 100 volume percent steam.

18. The process of claim 14 wherein a source of chromium is added to said composite.

19. The process of claim 14 wherein a source of at least one noble metal, rhenium or admixtures thereof is added to said composite.

20. A catalyst composition comprising in combination A and B wherein A is a zeolite having a Constraint Index of 1 to 12, and wherein B is a composition comprising 1 to 60 weight percent framework dealuminated Y zeolite, based on the total weight of the composition B;
40 to 99 weight percent of a matrix, based on the total weight of said composition B;
0.01 to 15 weight percent alumina incorporated into said matrix, added by ion exchange based on the total weight of said composition B;
0.01 to 10 weight percent rare earth, expressed as the oxides of same, based on the total weight of said composition B, dispersed, exchanged, impregnated or deposited in a composite of said framework dealuminated Y zeolite and said matrix.

21. The catalyst of claim 20 which further includes 0.01 to 1 weight percent chromium, expressed as $Cr_2O_3$, based on the total weight of said composition B.

22. The catalyst of claim 20 which further includes 0.01 to 100 ppm by weight, based on the total weight of said composition, of at least one noble metal, rhenium or mixtures thereof.

23. The catalyst of claim 20, in which the silica-alumina molar ratio of the framework dealuminated zeolite Y incorporated therein is from about 5 to 100.

24. The catalyst of claim 20, wherein the matrix is silica-alumina.

25. The catalyst of claim 20, wherein the unit cell size as determined by X-ray diffraction of the faujasite component in the finished catalyst has a value of from about 24.25 Angstroms to about 24.55 Angstroms.

26. A moving bed catalytic cracking catalyst comprising an essentially spherical particle, having the composition of claim 1, wherein the dealuminated Y zeolite is ultrastable Y; wherein said alumina is incorporated into a mixture of said ultrasonic Y and matrix.

27. The catalyst of claim 26, wherein the rare earth source is added to the composition after alumina is incorporated into said mixture.

28. The catalyst of claim 27 wherein the mixture of ultrastable Y and said matrix is in the form of said essentially spherical particle.

29. The catalyst of claim 28, wherein the matrix is formed in the presence of ultrasonic Y and is silica-alumina.

30. A fluid catalytic cracking catalyst in the form of microspheres, which act as fluid when suspended in oil, vapor, or gas having the composition of claim 1, and wherein the dealuminated Y zeolite is ultrastable Y an wherein said alumina is incorporated into a mixture of said ultrastable Y and matrix.

31. The catalyst of claim 28 wherein alumina is incorporated by an ion exchange technique.

32. The catalyst of claim 28 wherein the rare earth source is added to the composition after alumina is incorporated into said mixture.

33. The catalyst of claim 30, wherein said alumina is incorporated under conditions of ion exchange; wherein the mixture of ultrastable Y and said matrix is in the form of said essentially spherical particle.

34. The catalyst of claim 33, wherein the matrix is formed in the presence of ultrastable Y and is silica-alumina.

35. The catalyst of claim 1 wherein the rare earth content is 0.7 to 1.4% $RE_2O_3$.

36. The catalyst of claim 33 wherein said alumina is incorporated by exchange with an aqueous solution of $Al_2(SO_4)_3$, and following exchange the catalyst is washed until it is sulfate free.

* * * * *

UNITED STATES PATENT AND TRADEMARK OFFICE
CERTIFICATE OF CORRECTION

PATENT NO. : 4,880,787

DATED : November 14, 1989

INVENTOR(S) : R. G. Bundens, et al

It is certified that error appears in the above-identified patent and that said Letters Patent is hereby corrected as shown below:

Col. 15, line 19: "0.000" should be --0.0001--.

Col. 16, line 34: "ultrasonic" should be --ultrastable--.

Col. 16, line 42: "ultrasonic" should be --ultrastable--.

Signed and Sealed this

Fifteenth Day of January, 1991

Attest:

HARRY F. MANBECK, JR.

*Attesting Officer*     *Commissioner of Patents and Trademarks*